United States Patent
Kleiner et al.

(10) Patent No.: US 11,780,028 B2
(45) Date of Patent: Oct. 10, 2023

(54) METHOD FOR SEPARATING A WORKPIECE

(71) Applicant: TRUMPF Laser-und Systemtechnik GmbH, Ditzingen (DE)

(72) Inventors: Jonas Kleiner, Leonberg (DE); Daniel Flamm, Ludwigsburg (DE); Henning Rave, Stuttgart (DE)

(73) Assignee: TRUMPF LASER—UND SYSTEMTECHNIK GMBH, Ditzingen (DE)

( * ) Notice: Subject to any disclaimer, the term of this patent is extended or adjusted under 35 U.S.C. 154(b) by 0 days.

(21) Appl. No.: 18/181,588

(22) Filed: Mar. 10, 2023

(65) Prior Publication Data

US 2023/0241711 A1    Aug. 3, 2023

Related U.S. Application Data

(63) Continuation of application No. PCT/EP2021/072949, filed on Aug. 18, 2021.

(30) Foreign Application Priority Data

Sep. 11, 2020  (DE) ...................... 10 2020 123 790.1

(51) Int. Cl.
*B23K 26/0622* (2014.01)
*B23K 26/08* (2014.01)
(Continued)

(52) U.S. Cl.
CPC ........ *B23K 26/0624* (2015.10); *B23K 26/067* (2013.01); *B23K 26/0648* (2013.01); *B23K 26/0876* (2013.01); *B23K 26/364* (2015.10)

(58) Field of Classification Search
CPC .............. B23K 26/0876; B23K 26/067; B23K 26/0648; B23K 26/364; B23K 26/0624
(Continued)

(56) References Cited

U.S. PATENT DOCUMENTS

| 5,114,834 A | 5/1992 | Nachshon | |
| 6,992,026 B2 * | 1/2006 | Fukuyo | .................. H01L 21/78 700/121 |

(Continued)

FOREIGN PATENT DOCUMENTS

| DE | 3835636 A1 | 5/1989 |
| DE | 102007037133 A1 | 3/2008 |

(Continued)

*Primary Examiner* — Dana Ross
*Assistant Examiner* — Joseph W Iskra
(74) *Attorney, Agent, or Firm* — LEYDIG, VOIT & MAYER, LTD.

(57) ABSTRACT

A method for separating a workpiece along a separation line by using ultrashort laser pulses of a laser beam includes splitting the laser beam, using a beam splitter optical unit, into a plurality of partial laser beams. Each partial laser beam is focused by a focusing optical unit onto a surface and/or into a volume of the workpiece so that the partial laser beams are arranged next to one another and spaced apart from one another along the separation line. The method further includes implementing material ablation in the workpiece along the separation line by introducing the ultrashort laser pulses into the workpiece. The partial laser beams are repeatedly moved away from an initial position along the separation line by a deflection value and are subsequently moved back into the initial position. The deflection value is less than or equal to a distance between two adjacent partial laser beams.

12 Claims, 10 Drawing Sheets

(51) Int. Cl.
*B23K 26/364* (2014.01)
*B23K 26/06* (2014.01)
*B23K 26/067* (2006.01)

(58) Field of Classification Search
USPC .................................................. 219/121.72
See application file for complete search history.

(56) References Cited

U.S. PATENT DOCUMENTS

| | | | |
|---|---|---|---|
| 8,741,777 | B2 | 6/2014 | Shimoi et al. |
| 10,307,867 | B2 | 6/2019 | Hollinger et al. |
| 11,169,387 | B2 | 11/2021 | Tillkorn et al. |
| 2011/0297851 | A1 | 12/2011 | Lauer et al. |
| 2013/0334185 | A1 | 12/2013 | Nomaru |
| 2016/0121426 | A1* | 5/2016 | Hollinger ........... B23K 26/0676 425/174.4 |
| 2017/0326688 | A1 | 11/2017 | Turner et al. |
| 2019/0067049 | A1 | 2/2019 | Cheng et al. |

FOREIGN PATENT DOCUMENTS

| | | |
|---|---|---|
| DE | 102011017807 A1 | 10/2012 |
| DE | 102014203525 A1 | 8/2015 |
| DE | 102014103748 A1 | 9/2015 |
| DE | 102015222651 A1 | 6/2016 |
| DE | 102018205545 A1 | 10/2019 |
| DE | 102018211972 A1 | 1/2020 |
| WO | WO 2007096482 A2 | 8/2007 |
| WO | WO 2011116968 A2 | 9/2011 |
| WO | WO 2015108991 A2 | 7/2015 |

* cited by examiner

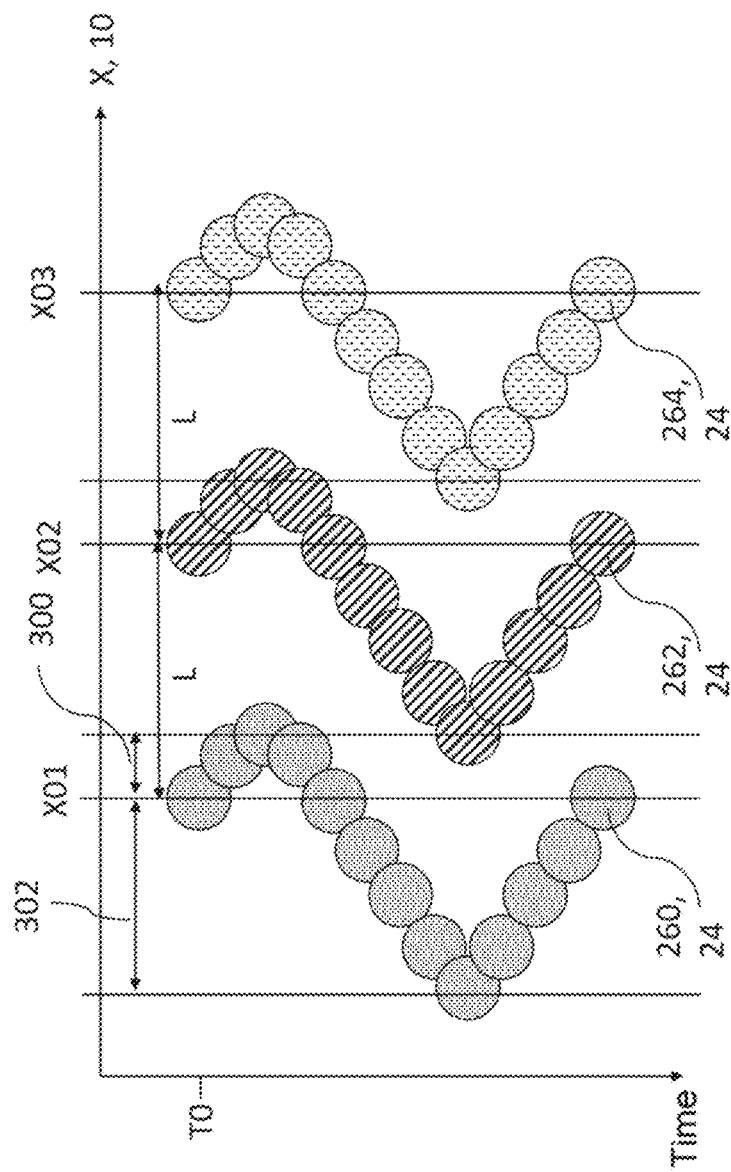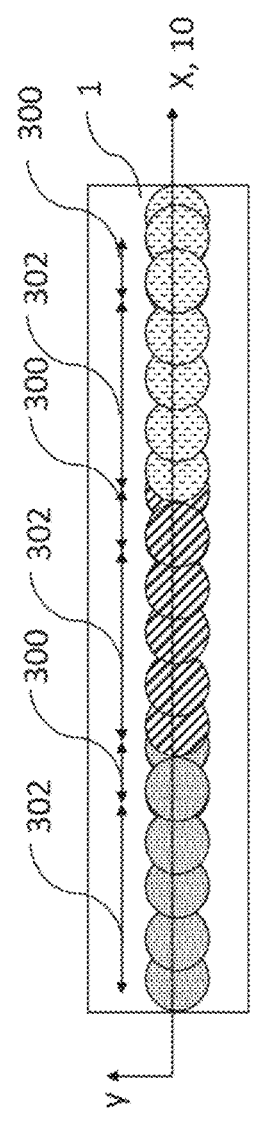

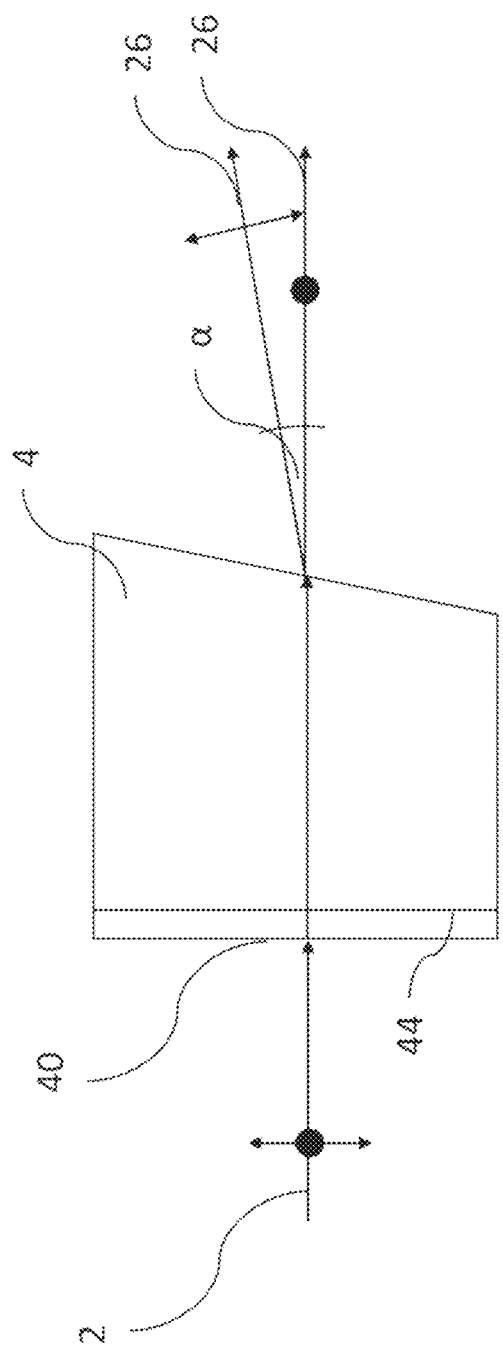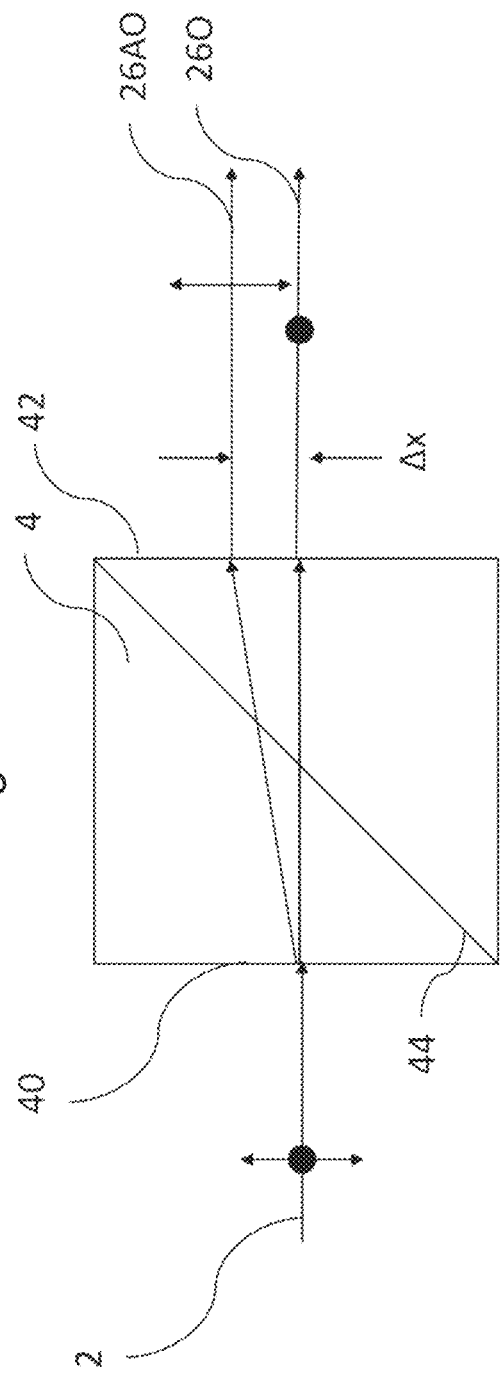

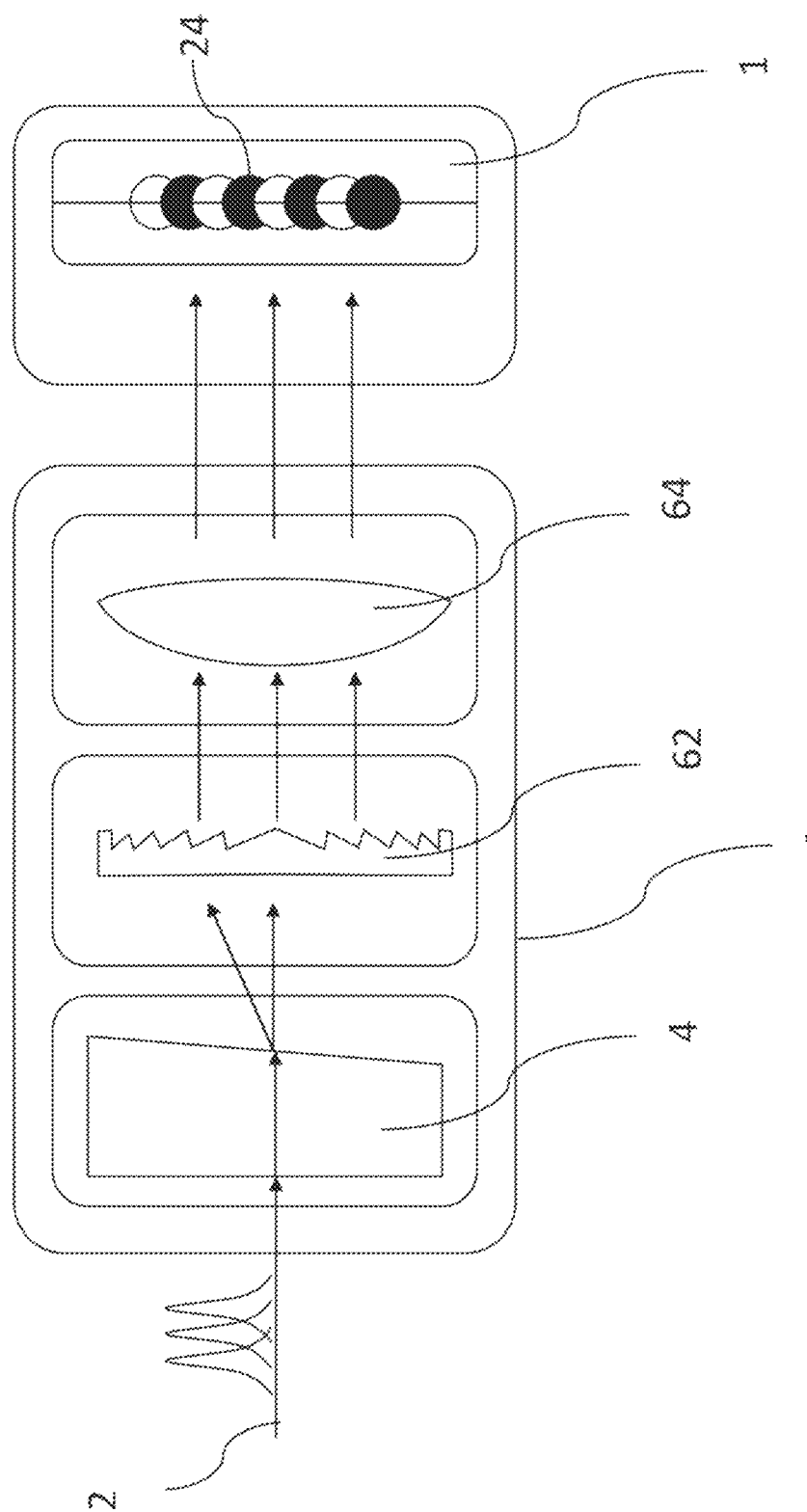

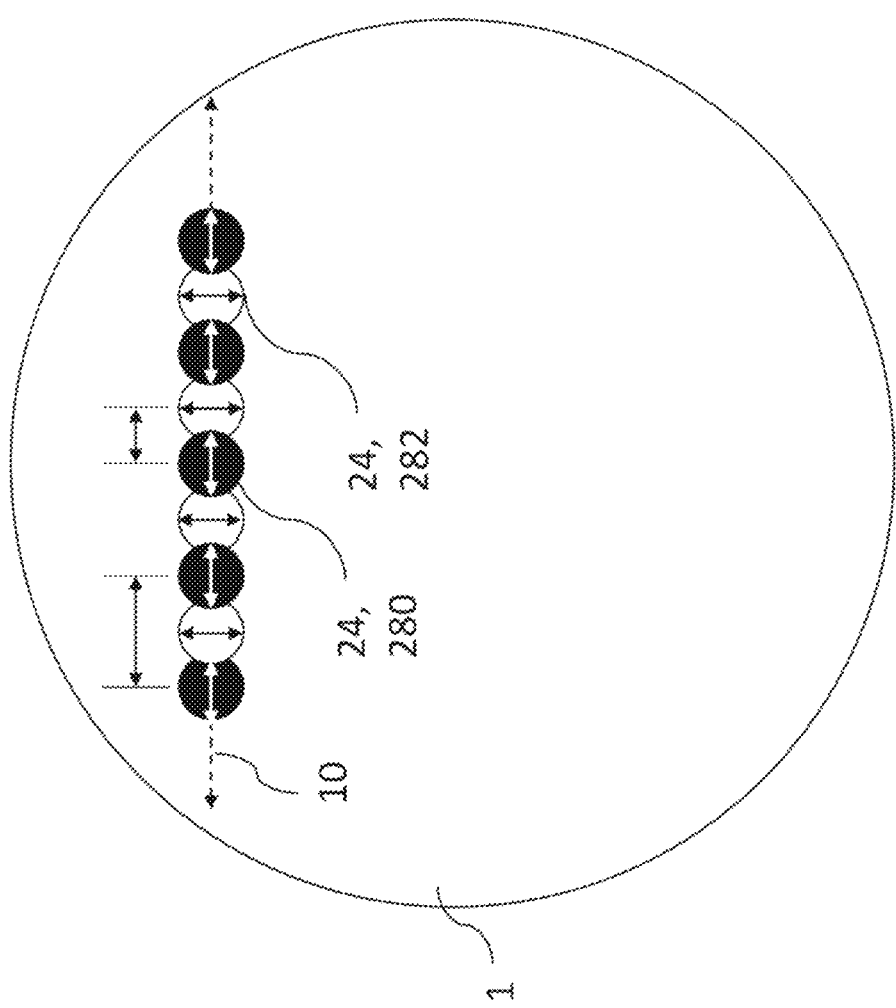

METHOD FOR SEPARATING A WORKPIECE

CROSS REFERENCE TO RELATED APPLICATIONS

This application is a continuation of International Application No. PCT/EP2021/072949 (WO 2022/053273 A1), filed on Aug. 18, 2021, and claims benefit to German Patent Application No. DE 10 2020 123 790.1, filed on Sep. 11, 2020. The aforementioned applications are hereby incorporated by reference herein.

FIELD

Embodiments of the present invention relate to a method for separating a workpiece along a separation line by using laser pulses of a laser beam.

BACKGROUND

The practice of separating workpieces by impingement with laser pulses is known, for example for the purpose of separating a portion of the workpiece out of the workpiece, with material ablation in the workpiece being able to be achieved by way of a laser beam impinging on the workpiece, the ablation for example being able to be achieved by sublimation of the material or by fusing, with the melt subsequently being driven out.

In this context, it is known to use what are known as multi-spot optics for the purpose of forming a multiplicity of partial laser beams and to use these partial laser beams by means of a scanner and/or displacement stage for the purpose of separating the workpiece.

The material ablation can be fashioned more effectively by the multiplicity of simultaneously introduced partial laser beams. However, the accurate positioning and alignment of the scanner and displacement stage systems, in particular, is of relevance in this case. For example, should the arrangement of partial laser beams be displaced over the entire breadth or the diameter of a silicon wafer, for example in order to cut chip structures of the order of a few millimeters from the wafer, then already a small angle deviation in the alignment may lead to the arrangement of the partial laser beams already passing through the actual chip structure after a certain movement distance, and hence destroying the product that should in fact be separated out, rather than cutting out the latter.

Moreover, when arrangements of partial laser beams are used to cut out parts of the silicon wafer, there is the problem that it is necessary to traverse a path that is longer than the actual contour to be machined, with the result that some of the partial laser beams at the edge of the wafer may damage the workpiece holder.

SUMMARY

Embodiments of the present invention provide a method for separating a workpiece along a separation line by using ultrashort laser pulses of a laser beam of an ultrashort pulse laser. The method includes splitting the laser beam, using a beam splitter optical unit, into a plurality of partial laser beams. Each of the partial laser beams is focused by a focusing optical unit onto a surface and/or into a volume of the workpiece so that the partial laser beams are arranged next to one another and spaced apart from one another along the separation line. The method further includes implementing material ablation in the workpiece along the separation line by introducing the ultrashort laser pulses into the workpiece. The partial laser beams are repeatedly moved away from an initial position along the separation line by a deflection value and are subsequently moved back along the separation line into the initial position. The deflection value is less than or equal to a distance between two adjacent partial laser beams.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 3A and 3B show schematic illustrations for explaining the time dependence when introducing the partial laser beams according to some embodiments;

FIGS. 4A and 4B show a schematic illustration of the polarizing beam splitter optical units according to some embodiments;

FIGS. 5A, 5B, and 5C show schematic illustrations of various options for generating partial laser beams with orthogonal polarization, and an optical arrangement of beam splitting and wobble elements and associated optical units for imaging onto the workpiece according to some embodiments;

FIG. 6 shows a schematic illustration of the method using partial laser beams with orthogonal polarization according to some embodiments.

DETAILED DESCRIPTION

Figure 1A:
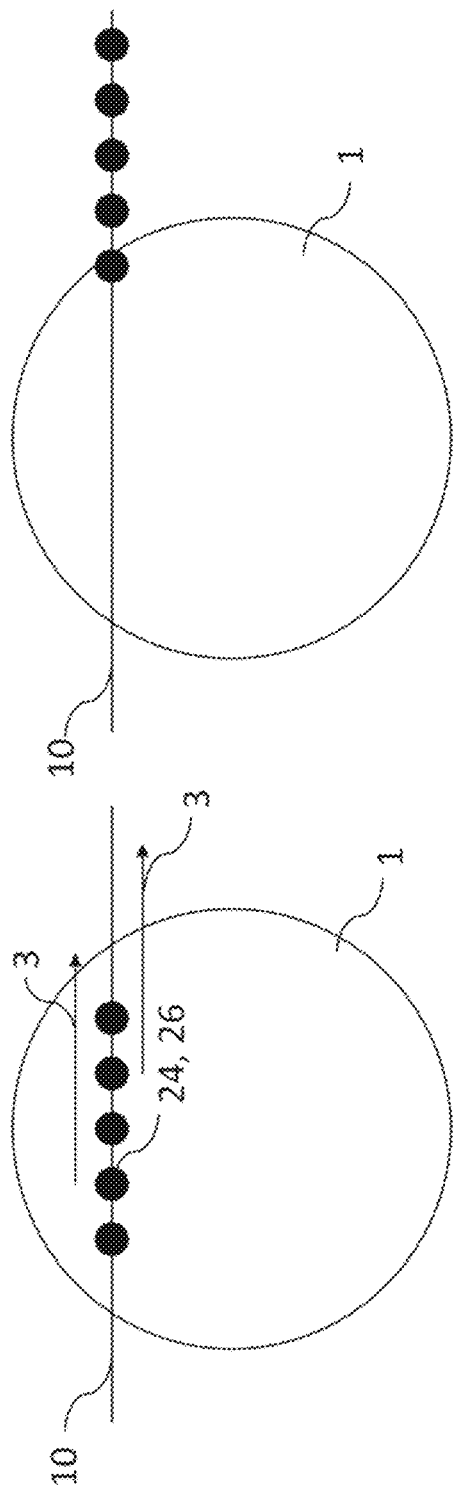
FIG. 1A shows a schematic illustration of a known method for separating a workpiece according to some embodiments.

Embodiments of the present invention provide a method for separating a workpiece along a separation line by means of laser pulses of a laser beam, preferably by means of ultrashort pulses of an ultrashort pulse laser, with the laser beam being split by means of a beam splitter optical unit into a plurality of partial laser beams and each of the partial laser beams being focused by way of a focusing optical unit onto the surface and/or into the volume of the workpiece so that the partial laser beams are arranged next to one another and spaced apart from one another along the separation line, with material ablation in the workpiece being implemented along the separation line by the introduction of the laser pulses into the workpiece. According to embodiments of the invention, the partial laser beams are repeatedly moved away from their initial position along the separation line by a deflection value and are subsequently moved back along the separation line into the initial position, with the deflection value being less than or equal to the distance between two adjacent partial laser beams.

In this case, the laser makes laser pulses available, with the laser pulses moving along a beam axis defined by the optical unit of the laser, as a result of which the laser beam of the laser is provided accordingly along this beam axis. The laser preferably is a short pulse laser providing pulses in the nanosecond range or an ultrashort pulse laser providing laser pulses in the picosecond range or femtosecond range.

Ultrashort pulse lasers emit laser pulses with a particularly high energy density over a short timescale, as a result of which particularly sharp edges arise along the separation line. In this case, the pulse length of an ultrashort laser pulse can be for example shorter than 100 ps, in particular shorter than 10 ps, particularly preferably shorter than 1.5 ps. However, the pulse length can for example also be longer than 300 fs. Typically, the pulse length is 1 ps. The peak fluence, that is to say the intensity of either the incident laser beam or a partial laser beam, can be between 0.3 J/cm$^2$ and 30 J/cm$^2$, and it is typically between 1 J/cm$^2$ and 5 J/cm$^2$. The focal diameter of the incident laser beam or a partial laser beam can be between 50 μm and 5 μm, and the focal diameter can particularly preferably be 9 μm.

The laser beam of the laser is guided through a beam splitter optical unit in order to divide the incident laser beam into a plurality of partial laser beams. By way of example, a beam splitter optical unit can be formed by a beam splitter cube which for example splits the incident laser beam into two partial laser beams of equal intensity.

A beam splitter optical unit may however also comprise an optical element which divides the beam into a plurality of partial laser beams and which deflects the partial laser beams so that all partial laser beams run parallel to one another and at a certain distance from one another. A beam splitter optical unit may also comprise a plurality of optical elements, with one element splitting the incident laser beam or beams into a plurality of partial laser beams and another element deflecting the partial laser beams into parallel directions.

By way of example, a beam splitter optical unit can ensure that an incident laser beam is split into five or ten or more partial laser beams.

A beam splitter optical unit moreover makes it possible to efficiently split the high pulse energies of a pulsed laser into various partial laser beams, with the result that the simultaneous processing with a plurality of partial laser beams, possibly in that case, makes it possible to increase the efficiency of the processing process.

The workpiece can preferably be a glass or a semiconductor. In particular, the workpiece may comprise one or more of the following materials: Si, SiC, Ge, GaAs, InP, glass and/or sapphire. In particular, the workpiece may also be constructed in the form of a layer system, with each layer of the layer system being able to comprise one or more of the aforementioned materials.

Therefore, the method can preferably be used when processing wafers. By way of example, the method can be used for separating silicon, for instance for separating a chip out of a silicon wafer.

The separation line is understood to mean the line along which the workpiece should be separated. By way of example, a separation line can be provided in the form of a straight line. However, a separation line can also be a curved line. In particular, a separation line can also be part of a more complex separation line or separation geometry.

For example, if the intention is to cut a rectangular shape out of the workpiece, the separation line may for example be only a side line of the rectangle but also be specified by the entire contour to be cut out.

The partial laser beams are arranged next to one another and spaced apart from one another along the separation line. In this case, the distance between adjacent partial laser beams is the distance between the geometric centers of the partial laser beams along the separation line. However, the distance may also be determined between the intensity maxima of adjacent partial laser beams along the separation line. The start and end points of the distance measurements may also be those points at which the laser beam or the beam axis intersects the surface of the workpiece.

The distance between adjacent partial laser beams can be the same size for all adjacent partial laser beams. By way of example, each partial laser beam can be at a distance of 5 μm or 10 μm or 100 μm from its neighbor. However, the distances between adjacent partial laser beams may also vary. Thus, for example, a partial laser beam may have a distance of 5 or more from one neighbor but only a distance of 3 μm or 10 μm or less from the other neighbor.

In particular, each partial laser beam only has two direct neighbors since the partial laser beams are arranged along the separation line.

The number of partial laser beams and the spacings thereof can be chosen so that partial laser beams are arranged at a distance from one another along the entire desired separation line. In other words, the entire region to be separated, which is defined by the separation line, is covered by partial laser beams.

However, the separation line is usually longer than the region covered by the partial laser beams, with the result that the bundle of partial laser beams has to be moved along the separation line in order to successively in this case cover the entire separation line with the partial laser beams and hence carry out a separation.

Each partial laser beam is focused using a focusing optical unit. By way of example, the focusing optical unit may comprise lenses or other diffractive elements, which convergently deflect that partial laser beams into a focal zone. In particular, this means that the intensity of the laser beam is brought together into a minimal spatial region within the focal zone. By way of example, the focusing optical unit may be provided on an individual basis for each partial laser beam. However, it is preferable for all partial laser beams to be focused using one focusing optical unit.

It may also be the case that the focusing optical unit deflects partial laser beams, which are incident on the focusing optical unit at different angles of incidence or which do not have parallel beam axes, onto parallel beam axes. In particular, this means that all partial laser beams are oriented parallel to one another following the passage through the focusing optical unit.

By way of example, the focusing optical unit may be adapted to the beam splitter optical unit such that the partial laser beams emanating from the beam splitter optical unit are incident on the focusing optical unit at different angles and these partial laser beams are then oriented parallel to one another again by the focusing optical unit. By way of example, this can be achieved if the beam splitter optical unit is in the focus of the focusing optical unit. By way of example, the focusing optical unit and the beam splitter optical unit may also be in conjugate planes to one another.

The partial laser beams can be focused onto the surface and/or into the volume of the workpiece. This means that the focal zone is located, for example, exactly on the surface of the material or in the beam direction below the surface of the material. All partial laser beams are preferably focused into the same plane.

In a development in which a separate focusing optical unit is provided for each partial laser beam, it is however also possible for one partial laser beam to be focused exactly onto the surface while another partial laser beam is focused into the volume of the material.

Alternatively, the beam splitter optical unit may also be designed so that a three-dimensional focal distribution arises, with the intensity maxima of the partial laser beams, that is to say in particular of at least one individual partial laser beam, being located both on the surface and in the volume of the workpiece.

The partial laser beams are focused by a focusing optical unit such that each partial laser beam converges in a focal zone. This means that the intensity of the laser beam is highest in the focal zone. By way of example, the focal zone may be made available in this case by a Gaussian laser beam or by a quasi-nondiffractive laser beam.

Nondiffractive beams satisfy the Helmholtz equation:

$$\nabla^2 U(x,y,z) + k^2 U(x,y,z) = 0$$

and have a clear separability into a transverse and a longitudinal dependence of the form.

$$U(x,y,z) = U_t(x,y)\exp(ik_z z)$$

auf. In this case, $k=\omega/c$ is the wave vector with its transverse and longitudinal components $k^2 = k_z^2 + k_t^2$, and $U_t(x,y)$ is an arbitrary complex-valued function that is dependent only on the transverse coordinates x, y. The z-dependence in the beam propagation direction in $U(x,y,z)$ leads to a pure phase modulation, and as a result the associated intensity I of the solution is propagation-invariant or nondiffractive:

$$I(x,y,z) = |U(x,y,z)|^2 = I(x,y)$$

This approach provides different classes of solutions in different coordinate systems, for example Mathieu beams in elliptic-cylindrical coordinates or Bessel beams in circular-cylindrical coordinates.

Experimentally it is possible to realize a multiplicity of nondiffractive beams in a good approximation, that is to say quasi-nondiffractive beams. In contrast to the theoretical construct, these merely carry finite power. Just as finite is the length L of the propagation invariance of these quasi-nondiffractive beams.

On the basis of the standard for laser beam characterization ISO 11146 1-3, the beam diameter is determined by way of the so-called 2nd moments. In this case, the power of the laser beam or else the 0th order moment is defined as:

$$P = \int dx\, dy\, I(x,y).$$

The spatial 1st order moments specify the centroid of the intensity distribution and are defined as:

$$\langle x \rangle = \frac{1}{P}\int dx\, dy\, x\, I(x,y),$$

$$\langle y \rangle = \frac{1}{P}\int dx\, dy\, y\, I(x,y).$$

On the basis of the equations above, it is possible to calculate the spatial moments of the 2nd order of the transverse intensity distribution:

$$\langle x^2 \rangle = \frac{1}{P}\int dx\, dy(x - \langle x \rangle)^2 I(x, y),$$

$$\langle y^2 \rangle = \frac{1}{P}\int dx\, dy(y - \langle y \rangle)^2 I(x, y),$$

$$\langle xy \rangle = \frac{1}{P}\int dx\, dy(x - \langle x \rangle)(y - \langle y \rangle) I(x, y).$$

Using the thus completely defined spatial moments of 2nd order of the laser beam, it is possible to determine the beam diameters in the principal axes. In this case, the principal axes are the directions of minimal and maximal extent of the transverse beam profile and these always run orthogonal to one another. Then, the beam diameter d of the laser beam arises as follows:

$$d_x = 2\sqrt{2}\left\{(\langle x^2 \rangle + \langle y^2 \rangle) + \gamma[(\langle x^2 \rangle - \langle y^2 \rangle)^2 + 4(\langle xy \rangle)^2]^{\frac{1}{2}}\right\}^{\frac{1}{2}},$$

$$d_y = 2\sqrt{2}\left\{(\langle x^2 \rangle + \langle y^2 \rangle) - \gamma[(\langle x^2 \rangle - \langle y^2 \rangle)^2 + 4(\langle xy \rangle)^2]^{\frac{1}{2}}\right\}^{\frac{1}{2}},$$

where $$\gamma = \frac{\langle x^2 \rangle - \langle y^2 \rangle}{|\langle x^2 \rangle - \langle y^2 \rangle|}.$$

The focal zone $d^{GF}_{x,y}$ of a Gaussian beam, the Gaussian focus, or the diameter of the Gaussian beam or Gaussian profile is consequently defined by way of the second moments, that is to say the variance of the Gaussian curve, and the associated characteristic length, the Rayleigh length $z_R = \pi(d^{GF}_{x,y})^2/4\lambda$, is defined as the distance starting from the focal position at which the beam cross section has increased by a factor of 2. In the case of a symmetric Gaussian beam, the following applies to the focal zone: $d^{GF}_0 = d^{GF}_x = d^{GF}_y$. Further, as transverse focal diameter in the case of quasi-nondiffractive beams $d^{ND}_0$, the transverse dimensions of local intensity maxima is defined as twice the shortest distance between an intensity maximum and an intensity drop to 25% proceeding therefrom The longitudinal extent of the focal zone in the beam propagation direction of these almost propagation-invariant intensity maxima gives the characteristic length L of the quasi-nondiffractive beam. This characteristic length is defined by way of the intensity drop to 50%, proceeding from the local intensity maximum in a positive and negative z-direction, that is to say in the propagation direction.

A quasi-nondiffractive beam is present exactly if for $d^{ND}_0 \approx d^{GF}_{x,y}$, that is to say similar transverse dimensions, the characteristic length L distinctly exceeds the Rayleigh length of the associated Gaussian focus, for example if $L>10z_R$.

Accordingly, the shape of the focal zones depends on the utilized beam profile.

To implement the method, the partial laser beams are moved away from their initial position along the separation line by a deflection value. In this case, the initial position is the position which the partial laser beams originally adopt on the surface of the material. In particular, the initial position is the position of the partial laser beams before deflection movement or movement away has taken place. In this case, the deflection value is the maximum distance of the moved partial laser beam from its initial position. The deflection value is measured in a manner analogous to the distance of the various partial laser beams along the separation line.

The deflection value is less than or equal to the distance between two adjacent partial laser beams. In particular, this may mean that the first partial laser beam is moved to the initial position of the directly adjacent second partial laser beam as a result of the movement. At the same time, the second partial laser beam can for example be moved to the initial position of an adjacent third partial laser beam, etc. This ensures that laser pulses are introduced into the material along the entire separation line, with the movement from the initial position by a deflection value initially achieving that even the gaps between the respective partial laser beams in the initial position are impinged upon with laser pulses.

Following the deflection, the partial laser beams are moved back into the initial position along the separation line. In terms of absolute value, the return movement may proceed with the same velocity as the previous movement. However, the return movement may also have a different speed profile.

However, the first partial laser beam may only be moved to the halfway point of the distance to the adjacent partial laser beam, for example. However, it may also be the case that the partial laser beams move two thirds of the distance in the direction of the separation line and subsequently, following the return to the initial position, move a third of the distance counter to the separation line. In particular, a movement along both directions of the separation line is possible.

The laser emits laser pulses while the partial laser beams are moved. As a result of the movement, it is consequently possible to introduce the laser pulses along the separation line. The introduction of the laser pulses may be tantamount to the laser pulses being wholly or partially absorbed by the material. By way of example, this may lead to the material being heated significantly by the laser pulses. This may lead to the heated material detaching from the overall composite of the material.

What this can achieve is that, to achieve a separation of the respective contour out of the workpiece, it is no longer necessary to traverse the contour with all partial laser beams, and so overshooting of the end contour with almost all partial laser beams no longer occurs. Accordingly, it is possible to achieve a particularly efficient and precise separation, within the scope of which only the region of the specified separation line can be impinged upon by partial laser beams and a damage to other regions of the workpiece can be avoided.

By way of example, the overshoot beyond the edges of the material, within the scope of which the workpiece holder may be damaged, is also dispensed with. Overall, the method allows individual components on the workpiece, for example on a silicon wafer, to be machined without the entire wafer having to be machined at once. Thus, overall, the flexibility in respect of different component geometries on the material is increased.

If the entire separation line can be impinged upon simultaneously by a bundle of partial laser beams, the movement per partial laser beam, that is to say the deflection value, is also significantly shorter than if an arrangement of partial laser beams, that is to say the totality of partial laser beams generated by the beam splitter optical unit, has to be guided over the entire material. Consequently, it is possible to dispense with complicated axis or scanner positioning and alignment.

Preferably, following the implementation of at least one movement of the partial laser beams away from the initial position by a deflection value and back into the initial position, the initial position is displaced along the separation line by a displacement value and the movement of the partial laser beams is carried out anew. This embodiment is preferably chosen if the bundle of partial laser beams is unable to cover the entire separation line and the separation along the separation line accordingly needs to be implemented successively. In this case, the displacement value preferably corresponds to the extent of the bundle of the partial laser beams in the separation line direction.

In other words, the simultaneous processing breadth specified by the bundle of the partial laser beams, to which the away and return movement have been applied, is used as a displacement value so that the simultaneous processing breadths are successively placed next to one another. As a result, a processing or separation of the workpiece along the separation line initially occurs in a first processing breadth and, following the completion of the separation of this portion of the separation line corresponding to the processing breadth, the bundle of partial laser beams is displaced by a displacement value such that a separation in processing breadth can once again occur here.

However, it is preferable if each structure to be separated from the workpiece can be separated using one processing breadth of the bundle of partial laser beams without a displacement. To this end, the number of partial laser beams and the distances thereof from one another is preferably adapted in such a way that a simultaneous processing of the entire length essential to the respective structure can be achieved. In other words, attempts are preferably made to for example cut one side of a chip at the same time.

Preferably, the movement of the partial laser beams away from the initial position by a deflection value and back to the initial position is carried out periodically.

The periodic movement means that the partial laser beams are deflected starting from their initial position and return back to the initial position after a fixed time interval. In particular, this may mean that the deflection is implemented along the separation line and the partial laser beams, after reaching the deflection value, once again return to the initial position and this is followed by a deflection along the separation line in the opposite direction and the partial laser beams, after reaching the deflection value, once again return to the initial position. However, it may also be the case that the periodic movement occurs between the initial position of a partial laser beam and the initial position of an adjacent partial laser beam.

In other words, the partial laser beams carry out a wobble movement, preferably a periodic wobble movement, along the separation line proceeding from the initial position.

The maximum deflection of the laser beams as a result of the movement can be of the order of the spacing between the partial laser beams, and can preferably be equal to the spacing of the partial laser beams.

As already described above, this has as a consequence that two adjacent partial laser beams sweep over the same location of the material within the movement period, with the result that gap-free processing of the material along the separation line is rendered possible.

In particular, this may also mean that adjacent partial laser beams travel beyond the initial position of the adjacent partial laser beam.

Preferably, all partial laser beams are focused into the same focal plane.

What this achieves is that all geometric focal zones in the partial laser beam direction have the same distance from the surface. By way of example, all partial laser beams can be focused exactly onto the surface. However, it may also be the case that all partial laser beams are introduced 10 μm below the surface. It may also be the case that all partial laser beams are located in a plane independently of a surface topology of the material.

In particular, it may be the case that all partial laser beams are introduced within a characteristic length of the partial laser beams with respect to the surface. By way of example, the characteristic length in this case may be the length within which the intensity of the laser beam or central maximum of the laser beam halves. In particular, this may be the Rayleigh length of a Gaussian beam. This is advantageous in that the separation procedure and the ablation depth are well controllable and a uniform separation edge arises.

All partial laser beams preferably carry out the same movement.

In this way it is possible to achieve both uniform material ablation and a simple structure of the apparatus provided to carry out the method.

To achieve a precise separation of the workpiece, the movement of the partial laser beams preferably follows the separation line. In particular, in the case of a straight separation line, the movement of the partial laser beams preferably is a linear deflection that follows the straight shape of the separation line and, in the case of a curved separation line, the deflection of the partial laser beams preferably is a deflection that follows the curved shape of the separation line.

In other words, the partial laser beams are preferably always located on the separation line, even when implementing their wobble movement.

This may mean in particular that the separation line is not curved, that is to say has no geometric curvature. The partial laser beams can only be moved along the separation line, and therefore there is a linear deflection if the partial laser beams are guided along a straight separation line. In particular, this means that the deflection likewise occurs along a straight line and consequently always is a linear deflection.

The movement of the partial laser beams is preferably correlated with the repetition rate of the laser providing the laser beam in order to ensure uniform material ablation.

In the case of a constant speed of the movement of the partial laser beams, the repetition rate or a pulse rate of the laser can accordingly be chosen so that the separation line is swept over without gaps. By way of example, this may mean that the repetition rate has to be 1 MHz in the case of a movement speed of 5 μm/μs and a focal diameter of 10 This ensures that the partial laser beam sweeps over each point of the separation line, and introduces laser pulse energy, during its movement. However, this may also mean, in particular, that the repetition rate is chosen to be significantly faster such that the focal zones of successively introduced laser pulses of the same partial laser beam overlap, that is to say that the distance of successively introduced laser pulses is smaller than the focal diameter or the diameter of the focal zone.

By contrast, if the movement speed is not constant, the repetition rate or the pulse rate can be adapted to the speed of the movement. By way of example, in the case of a sinusoidal deflection along the separation line, few laser pulses may be introduced during the movement at the amplitude maximum, where the speed of the movement is particularly small, while particularly many laser pulses have to be introduced during the zero crossings of the movement, where the movement speed is high. By way of example, the pulse rate can consequently be proportional to the movement speed.

Consequently, it is possible to introduce the laser energy of the partial laser beams with a uniform distribution along the separation line, with the result that uniform material ablation is ensured. In particular, uniform material ablation is expressed by virtue of the fact that the ablation depth is substantially the same size along the separation line (provided the material surface is flat).

The input laser beam and/or the partial laser beams can be decomposed into two mutually orthogonal polarization components during the passage through a birefringent polarizer element.

Birefringence is understood to mean the capability of an optical material to separate the incident laser beam into two partial laser beams with perpendicular polarization with respect to one another. This happens on account of different refractive indices of the optical material depending on the polarization and the angle of incidence of the light relative to the optical axis of the optical material.

Within the meaning of this application, partial laser beams polarized perpendicularly to one another are understood to mean linearly polarized partial laser beams whose polarization directions are oriented at an angle of 90° to one another. However, partial laser beams polarized perpendicularly to one another are also understood to mean circularly polarized partial laser beams having an opposite rotation sense, that is to say two left and respectively right circularly polarized partial laser beams. The conversion of linearly polarized partial laser beams having polarization directions oriented perpendicularly to one another into circularly polarized partial laser beams having an opposite rotation sense can be effected with the aid of a suitably oriented retardation plate (quarter-wave plate), for example.

The emergent laser beams decomposed according to polarization components by the birefringent polarization element may have an angular offset and/or spatial offset with respect to one another.

This can also be explained by the anisotropy of the refractive index for different polarization directions of the optical material of the polarization element.

By way of example, the partial laser beams may have an angular offset after passing through the birefringent polarization element. This means that the partial laser beam with a first polarization downstream of the birefringent polarization element does not run parallel to the partial laser beam with a second polarization.

In order to produce the angular offset (without a spatial offset), the birefringent polarizer element can have a beam exit surface that is inclined at an angle with respect to the beam entrance surface. In this case, the optical axis of the birefringent crystal is typically aligned parallel to the beam entrance surface. In this case, at the beam exit surface, the two partial laser beams emerge from the birefringent crystal at the same position and with a defined angular offset.

By way of example, the partial laser beams may have a spatial offset after passing through the birefringent polarization element. This means that the partial laser beam with the first polarization downstream of the birefringent polarization element does not run parallel to the partial laser beam with the second polarization. However, the two partial laser beams are shifted parallel to one another such that there is a finite distance between the two partial laser beams.

In order to produce the spatial offset (without an angular offset), the birefringent polarizer element can have for example generally planar beam entrance and beam exit surfaces aligned parallel. In this case, the optical axis of the birefringent crystal is typically oriented at an angle with respect to the beam entrance surface. If the input laser beam impinges on the beam entrance surface perpendicularly, a pure spatial offset is produced at the beam exit surface.

The distances between the individual partial laser beams with different polarization can be defined by way of the polarization element, for example during the production thereof or by way of the orientation of the optical axis of the crystal with respect to the incident laser beam.

The partial laser beams arranged next to one another and at a distance from one another along the separation line may have an alternating polarization.

The polarization is alternating if adjacent partial laser beams have mutually orthogonal polarizations. By way of example, the polarization is alternating if a first partial laser beam has a right circular polarization, a second partial laser beam has a left circular polarization, a third partial laser beam has a right circular polarization, etc. By way of example, the polarization is alternating if a first partial laser beam is polarized along the separation line, a second partial laser beam is polarized orthogonal to the separation line, a third partial laser beam is polarized along the separation line, etc.

If a laser beam which, for example, is generated by a single-mode laser and has a Gaussian beam profile is split into two or more partial laser beams and the partial laser beams are at least partially superposed, this can result in undesired interference effects if the partial laser beams have the same or a similar polarization. Therefore, during the focusing of the partial laser beams, the focal zones or the focal cross sections cannot be arbitrarily close together, and so the partial laser beams are generally focused at focal zones spaced apart from one another on the workpiece.

With the use of partial laser beams having mutually perpendicular polarization states, the (partial) superposition does not give rise to interference effects of the laser radiation from different spatial or angular ranges, provided that the polarization state of the respective partial laser beams is uniform over the entire relevant beam cross section or the respective focal zone. The polarization of a respective partial laser beam should therefore vary as little as possible over the beam cross section or over the focal zone as a function of position. In this case, the focal zones can be arbitrarily close to one another, partly or possibly completely overlap and even form homogeneous focal zones, specifically both transversely, that is to say perpendicularly to the direction of propagation of the partial laser beams, and longitudinally, that is to say in the direction of propagation of the partial laser beams.

Preferably, the beam splitter optical unit comprises a diffractive beam splitter optical unit and/or a diffractive optical element and/or a system of microlens arrays.

By way of example, the beam splitter optical unit can be designed in the form of a diffractive optical element. However, this may also relate to a different type of beam splitter optical unit, for example a geometric beam splitter optical unit. The beam splitter optical unit can be arranged upstream of the polarizer element in the beam path of the laser beam entering the processing optical unit and can produce a plurality of input laser beams which are split in each case into a pair of partial laser beams polarized perpendicularly to one another at the polarizer element. The opposite case is possible, too, that is to say the beam splitter optical unit can be arranged downstream of the birefringent polarizer element in the beam path. In this case, from the pair of partial laser beams generated by the polarizer element, the beam splitter optical unit produces a plurality of pairs of partial laser beams, the focal zones of which can partly overlap one another along a preferred direction in particular as described further above. By way of example, a beam splitter optical unit can be a diffractive optical element or a microlens array optical unit for transverse beam splitting. The beam splitter optical unit may also comprise a microlens array, preferably a system of microlens arrays.

Microlens arrays comprise arrangements of a plurality of microlenses. In this case, microlenses are small lenses, in particular lenses with a typical distance ("pitch") from lens center to lens center of 0.1 to 10 mm, preferably 1 mm, with each individual lens of the arrangement being able to have the effect of a normal, macroscopic lens. Microlens arrays can act as a beam splitter in the totality thereof.

The number of partial laser beams is defined by the design of the diffractive optical element or beam splitter optical unit in combination with the polarization element. The distances of the individual partial laser beams from one another are likewise defined by the design of the diffractive optical element.

Preferably, the movement of the partial laser beams is generated by a movement of at least one part of the processing optical unit, wherein the movement is particularly preferably generated by microlens arrays of a system of microlens arrays and/or by a repositioning optical unit.

By way of example, the processing optical unit may have an additional lens optical unit which images the partial laser beams made available by the beam splitter optical unit into an optical plane. From there, the partial laser beams are imaged into the workpiece using the focusing optical unit. In the beam propagation direction, the lens optical unit first comprises a first lens and finally a second lens, with the said optical plane being arranged between the second lens and the focusing optical unit.

A repositioning optical unit can be arranged in the aforementioned optical plane, with the partial laser beams being repeatedly moved away from their initial position along the separation line by a deflection value and subsequently moved back along the separation line into the initial position by way of the repositioning optical unit.

By way of example, the repositioning optical unit can be a scanner mirror, for example a piezo mirror or a galvano scanner. The repositioning optical unit may also comprise an acousto-optic deflector or a polygonal wheel or two continuously rotated wedge plates, the rotational frequency of which corresponds to the frequency of the repositioning.

However, it is also possible to move a part of the processing optical unit, in particular of the lens optical unit, in particular the second lens, for the purposes of moving the partial laser beams. In this context, the lens is moved in the plane perpendicular to the beam propagation direction so that the deflection of the partial laser beams in the plane perpendicular to the beam propagation direction is effected on or in the workpiece.

In particular, parts of the microlens array optical unit may also be moved for the purpose of moving the partial laser beams. In this context, it may be sufficient for individual microlens arrays to be moved in the system of microlens arrays.

The movement amplitude of the part of the processing optical unit, in particular of the moved microlens array or the repositioning optical unit, therefore defines the deflection value along the separation line. If the part of the processing optical unit or of the repositioning optical unit is not deflected, the imaging of the partial laser beams onto the material defines the initial position of the partial laser beams on the material.

Preferred exemplary embodiments are described below with reference to the figures. In this case, elements that are the same, similar or have the same effect are provided with identical reference signs in the different figures, and a repeated description of these elements is dispensed with in some instances, in order to avoid redundancies.

FIG. 1A schematically shows a known method for separating a workpiece 1. In the process, the workpiece 1 is separated with the aid of partial laser beams 26 which are generated from one or more incident laser beams by means of a beam splitter optical unit which is not shown here. To this end, the various partial laser beams 26 are introduced into the workpiece 1 along the desired separation line 10. In particular, the workpieces can be transparent or partially transparent or partially opaque or completely opaque in relation to the utilized laser wavelength. The laser pulses which are formed by the introduced partial laser beams 26 and which are at least partially absorbed within the workpiece 1 lead to the material of the workpiece 1 heating up, at least in the respective focal zones 24 of the partial laser beams 26, with the result that the heated material is separated in these regions, for example by sublimation or the driving-out of molten material, alternatively by photomechanical ablation or spallation. This results in material ablation which ultimately leads to a separation of the workpiece 1.

To ensure uniform material ablation along the separation line 10, the partial laser beams 26 are displaced along the separation line 10 relative to the workpiece 1 to be separated in the known method, for example using a scanner system or an axis system, in order to obtain an overall displacement 3.

In particular, the partial laser beams 26 are displaced in such a way that each partial laser beam 26 sweeps over the entire separation line 10. This has as a consequence that, for example, a first partial laser beam 26 only reaches the end of the separation line 10 when another partial laser beam 26 has already been driven beyond the workpiece 1. In other words, the partial laser beams 26 do not only sweep over the provided region of the separation line 10 but at least a number of the partial laser beams 26—usually all apart from one—are displaced further than required by the actual separation line 10 in order to correspondingly achieve an action of all partial laser beams 26 along the separation line 10. This driving beyond the actual desired end of the separation line 10 may give rise to unwanted effects, for example damage to the workpiece holder.

Figure 1B:
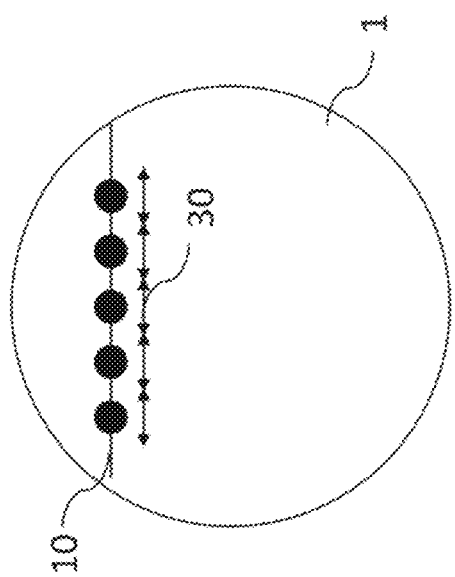
FIG. 1B shows a schematic illustration of a method for separating a workpiece according to some embodiments.

By contrast, FIG. 1B shows the proposed method according to the present disclosure. The various partial laser beams 26 are generated during the passage of a laser beam through a beam splitter optical unit (shown schematically below, for example in FIG. 5A). Each partial laser beam 26 is focused onto the surface and/or into the volume of the workpiece 1 using a focusing optical unit (likewise shown schematically below, for example in FIG. 5A). Alternatively, a plurality or all of the partial laser beams 26 can be focused onto the surface or into the volume of the workpiece 1 using a single focusing optical unit.

In this case, the partial laser beams 26 are arranged next to one another and spaced apart from one another along the separation line 10. In particular, the partial laser beams 26 are spaced so far from one another that there are no interference effects between the various partial laser beams. In other words, the focal zones 24 of the adjacent partial laser beams 26 do not overlap.

By introducing the partial laser beam 26 into the focal zone 24 initially only a part of the workpiece 1 is ablated depending on the introduced laser power, with the result that material of the workpiece 1 remains below the focal zone 24 of the partial laser beam 26.

The partial laser beams 26 are now introduced into the workpiece 1 in their initial position and are subsequently deflected along the separation line 10. In this case, the value of the deflection 30 is less than or equal to the distance between two adjacent partial laser beams 26. Subsequently, the partial laser beams are moved back into the initial position along the separation line 10. In other words, proceeding from the initial position, the partial laser beams 26 are moved backwards and forwards in such a way that the respective partial laser beam 26 at best overlaps with the initial position of the respective directly adjacent partial laser beam 26.

In particular, this backward and forward movement can be periodic. Such a backward and forward movement of the partial laser beams may also be referred to as a wobble movement.

While the partial laser beams 26 are moved, the laser pulses forming the respective partial laser beam 26 are introduced into the workpiece 1 in such a way that they bring about an energy input along the separation line 10. Hence, uniform material ablation is ensured.

Figure 2C:
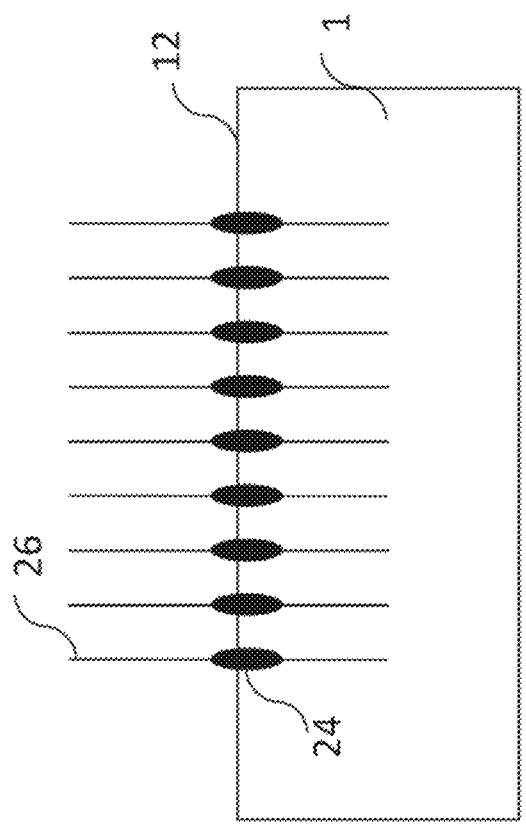
FIGS. 2A, 2B, 2C and 2D show schematic illustrations for explaining the determination of the distance between the partial laser beams according to some embodiments.
Figure 2A:
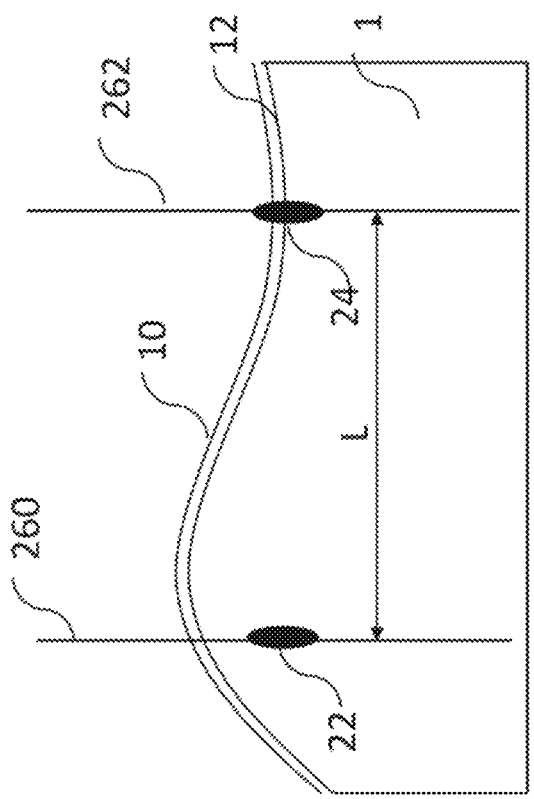

FIG. 2A shows a sketch to clarify the determination of the distance of the partial laser beams 26 from one another. In this context, it is assumed that the surface 12 of the workpiece 1 has curvature or is uneven. However, the determination of the distance can be implemented analogously for flat surfaces 12. However, in general, the wafers in the case of the preferred use of the method in wafer processing hardly have curvature.

In this case, a beam splitter optical unit splits the laser beam 2 into a first partial laser beam 260 and a second partial laser beam 262. The first partial laser beam 260 runs substantially parallel to the second partial laser beam 262, with the focal zone 22 of the first partial laser beam 260 being located in the volume of the workpiece 1 and the focal zone 24 of the second partial laser beam 262 being located on the surface 12 of the workpiece 1. All that is relevant for determining the distance between the two partial laser beams is the direct distance L between the partial laser beams 260, 262, with the distance L being measured between the beam axes of the first and the second partial laser beam.

Figure 2B:
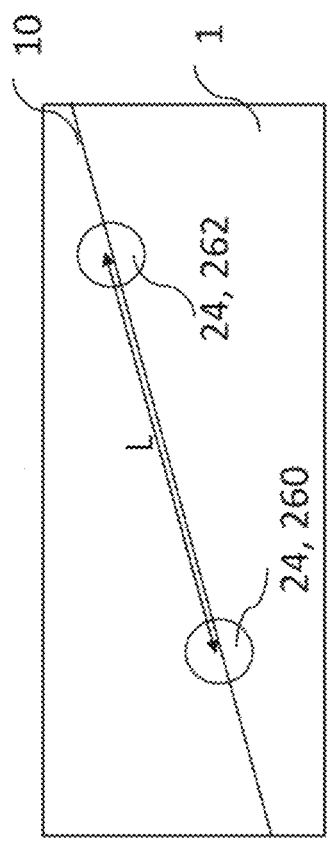

FIG. 2B shows the situation of FIG. 2A in a plan view. The two partial laser beams 260 and 262 are introduced into the workpiece 1 at a distance from one another and next to one another along the separation line 10. From the bird's eye view, the curvature of the surface 12 of the workpiece 1 is not visible, and so the direct geometric connection of the two beam axes of the partial laser beams 260 and 262 is suitable for determining the distance L between the two partial laser beams 260, 262.

FIG. 2C shows a further side view of the method; in particular, what is shown is that a multiplicity of partial laser beams 26 can be introduced into the workpiece 1. All partial laser beams 26 are focused into the same focal plane. This means that all focal zones are located in one plane. In this case, the focal plane is given by the surface 12 of the workpiece 1.

Figure 2D:
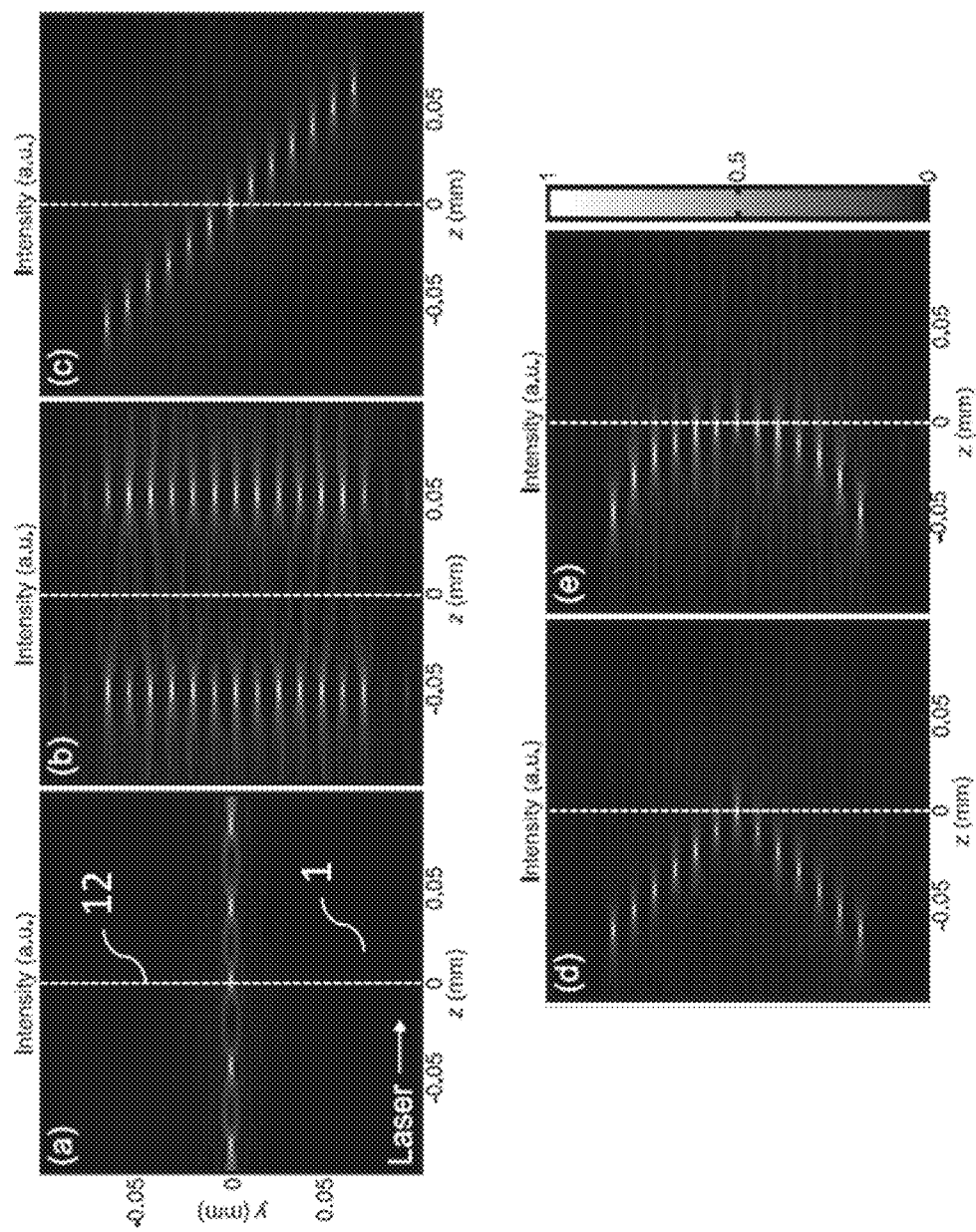

FIG. 2D shows various three-dimensional focal distributions of the beam splitter optical unit, with the intensity maxima of the partial laser beams being located both on the surface and in the volume of the workpiece. The laser beam is incident on the surface 12 of the workpiece at z=0 from the negative z-direction, with the volume of the material being located in the positive z-range.

FIG. 3A shows a schematic illustration of the time profile of a possible movement and deflection of the partial laser beams 260, 262, 264 during the backward and forward movement.

By way of example, these partial laser beams 260, 262, 264 are generated by means of a beam splitter optical unit and are focused into the workpiece 1 or onto the surface 12 of the workpiece 1 with the aid of the focusing optical unit. In the embodiment shown, the partial laser beams have a uniform distance from one another, that is to say the distance L between two adjacent partial laser beams 26 is always the same, that is to say the same at all times.

Moreover, the x-axis of the diagram extends along the separation line 10 whereas the y-axis represents the time axis t. The first partial laser beam 260 is focused into the workpiece 1 such that the laser pulses, for example of an ultrashort pulse laser, bring about material ablation in the workpiece 1, in the focal zone 24 of the first partial laser beam 260. By way of example, this can be implemented by way of a mechanism known as laser ablation or laser drilling or laser cutting. A certain amount of material ablation is achieved by each pulse or each pulse train of the pulsed laser.

The following description is provided explicitly for the first partial laser beam 260, but it applies analogously to the other partial laser beams 262, 264. From its initial position X01, the first partial laser beam 260 is initially deflected along the separation line 10, to be precise by the deflection value 300. By way of example, pulses are emitted continuously by the pulsed laser while the partial laser beam 260 is deflected. As a result, three laser pulses, for example, are introduced into the workpiece 1 along the path between the initial position X01 and the point where the deflection value 300 is attained. Subsequently, the first partial laser beam 260 is moved back into its initial position X01, with the result that a total of five laser pulses have been introduced into the workpiece 1 when the initial position X01 is reached. Subsequently, the partial laser beam 262 is moved along the separation line 10 in the opposite direction until a deflection value 302 has been attained. In the figure, the deflection value 302 differs from the deflection value 300, with the result that the movement is asymmetric in particular. However, the deflection always occurs along the separation line 10. Then, a total of nine laser pulses were introduced into the workpiece 1 up to the reversal point, at which the deflection value 302 is attained. Subsequently, the partial laser beam 260 is brought back into the initial position X01, once again along the separation line 10, with an additional four laser pulses being introduced into the workpiece 1.

The movement within the scope of the first part of the movement, in which the laser pulses were introduced to the right of the initial position in the figure, was carried out at a first speed. The movement within the scope of the second part of the movement, in which the laser pulses were introduced to the left of the initial position in the figure, was carried out at a second speed. In particular, these movements can also be driven with a speed profile—by way of example, use can be made of sawtooth-shaped curves or sinusoidal curves or cosinusoidal curves or triangular curves.

The pulse rate of the pulsed laser can be adapted in the process, with the result that the pulses are introduced uniformly into the workpiece 1 by each partial laser beam 26 on the separation line 10, as a result of which uniform material ablation takes place. In particular, the movement speed in this case may also be adapted to the deflection value, with the result that the same number of laser pulses are always introduced into the workpiece 1 per deflection value.

The partial laser beam 260 is introduced into the workpiece 1 together with the second partial laser beam 262 and the third partial laser beam 264. All partial laser beams are in their initial positions X01, X02 and X03 at the start time TO. Subsequently, all partial laser beams are displaced along the separation line 10 by the deflection value 300, subsequently returned to the initial position, subsequently displaced in the opposite direction along the separation line 10 by the deflection value 302, and ultimately returned back to the initial positions. In this case, the distance L between the partial laser beams is always the same, with the result that the movement of the partial laser beams along the separation line 10 is also the same.

In this case, the deflection values 300, 302 along the separation line 10 can be chosen so that the sum thereof corresponds exactly to the distance between the partial laser beams. This ensures that adjacent partial laser beams sweep over the same point on the separation line 10. By way of example, the second laser beam 262, at its maximum deflection by the deflection value 302 along the separation line 10, sweeps over the same point on the separation line 10 which the first partial laser beam 260 reaches in the case of its maximum deflection value 300 along the separation line 10. The same applies analogously to the two partial laser beams 262 and 264. Since adjacent partial laser beams sweep over the same point on the separation line 10, uniform material ablation is consequently ensured.

FIG. 3B shows the introduced laser pulses of the various partial laser beams 260, 262, 264 from the bird's eye view onto the workpiece 1. It is quite apparent that there is no point along the separation line 10 that was not swept by the partial laser beams, with the result that uniform material ablation is ensured.

Adjacent partial laser beams 260, 262, 264 cannot be introduced into the workpiece 1 at an arbitrarily small distance from one another if the adjacent partial laser beams have the same polarization. This is due to arising interference effects, as a result of which the adjacent partial laser beams could locally partially cancel one another out (destructive interference) or amplify one another (constructive interference). By contrast, if adjacent partial laser beams have different, more particularly orthogonal polarizations with respect to one another, then the partial laser beams cannot interfere with one another. It is for this reason that the laser beam 2 can be split into different polarization components and the partial laser beams which are then introduced into the workpiece 1 can in turn be formed from these polarization components.

In this respect, FIGS. 4A, B show schematically represented birefringent polarizer elements 4, by means of which it is possible to decompose a laser beam 2 into various polarization components. By way of example, the birefringent polarizer elements 4 may be provided in the form of a birefringent crystal. Various birefringent materials can be used as crystal material for the polarizer element 4, for example alpha-BBO (alpha-barium borate), YVO4 (yttrium vanadate), crystalline quartz, etc.

The birefringent polarizer element 4 in FIG. 4A has a wedge-shaped embodiment, that is to say a planar beam entrance surface 40 for the entrance of an entering laser beam 2 and a planar beam exit surface 42 of the polarizer element 4 are aligned at a (wedge) angle with respect to one another. The or an optical axis 44 of the crystal material is oriented parallel to the beam entrance surface 40.

The laser beam 2 entering the birefringent polarizer element 4 perpendicularly to the beam entrance surface 40 in unpolarized or circularly polarized fashion is split into two partial laser beams 26, which are perpendicular to one another (s- and p-polarized, respectively), at the beam exit surface 42, which is inclined at an angle with respect to the beam entrance surface 40. In FIG. 4A, as generally customary, the s-polarized partial laser beam 26 is identified by a dot, while the second, p-polarized partial laser beam 26 is identified by a double-headed arrow. The first, p-polarized partial laser beam 26 is refracted to a lesser extent than the second, s-polarized partial laser beam 26 upon emergence from the birefringent polarizer element 4, with the result that an angular offset α occurs between the first and second partial laser beams 26. In this case, the first and second partial laser beams 26 emerge from the birefringent polarizer element 4 at the same location at the beam exit surface 42, that is to say that an angular offset a, but no spatial offset, is produced between the two partial laser beams 26.

In the case of the polarizer element 4 shown in FIG. 4B, the beam entrance surface 40 and the beam exit surface 42 are aligned parallel to one another and the optical axis 44 of the crystal material is oriented at an angle of 45° with respect to the beam entrance surface 40. In this case, the input beam 2 impinging perpendicularly to the beam entrance surface 40 is split into a first partial laser beam 260 in the form of an ordinary ray and a second partial laser beam 26AO in the form of an extraordinary ray at the beam entrance surface 2a. The two partial laser beams 26 emerge parallel, that is to say without an angular offset, but with a spatial offset Δx at the beam exit surface 42.

The two birefringent polarizer elements 4 illustrated in FIGS. 4A, B thus differ fundamentally in that the polarizer element 4 shown in FIG. 4A produces an angular offset α (without a spatial offset) and the polarizer element 4 shown in FIG. 4B produces a spatial offset Δx (without an angular offset). Both polarizer elements 4 can form a component of a processing optical unit 6, which can be embodied for example as illustrated in FIG. 5A. It goes without saying that the processing optical unit 6 can also comprise polarizer elements which produce both a spatial offset Δx and an angular offset a, as is the case in conventional prism polarizers, which generally comprise two birefringent optical elements.

FIG. 5A shows a processing optical unit 6 which comprises a birefringent polarizer element 4 for decomposing the laser beam 2 into partial laser beams that are polarized perpendicularly to one another, a diffractive beam splitter optical unit 62 for generating a plurality of pairs of partial laser beams 26 of different polarization, and a schematically indicated focusing optical unit 64 for focusing the partial laser beams 26 into focal zones 24.

The processing optical unit 6 illustrated in FIG. 5A comprises a focusing optical unit 64, which serves for focusing the partial laser beams 26 onto a focal plane, which lies on the surface 12 of a workpiece 1 to be processed in FIG. 5A.

However, unlike what is shown in FIG. 5A, the focal plane may also be located above the surface 12 or in the workpiece 1. The entering laser beam 2, for example from a pulsed laser or ultrashort pulse laser, is incident on the birefringent polarizer element 4 in which two partial laser beams 26 are generated.

In the case of the processing optical unit 6 shown in FIG. 5A, a diffractive beam splitter optical unit 62 is arranged downstream of the polarizer element 4 in the beam path. However, the diffractive beam splitter optical unit 62 may alternatively also be arranged upstream of the polarizer element 4.

The processing optical unit 6 depicted in FIG. 5A can, at least in part, be moved relative to the workpiece 1 such that this enables a movement of the partial laser beams 26 along the separation line 10.

In the case of the processing optical unit 6 illustrated in FIG. 5A, the birefringent polarizer element 4 is arranged in a plane that is optically conjugate with respect to the focal plane. The optically conjugate plane is linked with the focal plane by an angle-to-position transformation (Fourier transform) generated by the focusing optical unit 64. Angles in the optically conjugate plane correspond to positions in the focal plane, and vice versa. The two partial laser beams 26 emerging from the polarizer element 4 with the angular offset α are therefore focused with a spatial offset Δx of the two centers of the focal zones 24 in the focal plane. In this case, the spatial offset is smaller than the diameter of the focal zones 24, with the result that the two focal zones 24 overlap one another. Owing to the absence of the spatial offset of the two partial laser beams 26 emerging from the polarizer element 4, the two partial laser beams 26, after passing through the focusing optical unit 64, are aligned parallel and perpendicularly to the focal plane.

The focal zones 24 of a pair of adjacent partial laser beams of different polarization are formed by partial laser beams 26 which are in each case polarized perpendicularly to one another and which partially overlap. In addition, the focal zones 24 of respectively two partial laser beams 26 polarized perpendicularly to one another in respectively two directly adjacent pairs also overlap one another. In all the focal zones 24 illustrated in FIG. 5A, only partial laser beams 26 polarized perpendicularly to one another overlap one another, and so no interference effects occur between the partial laser beams 26 of the same polarization. The substantially linear intensity distribution generated in the focal plane in this way extends along the separation line 10.

Advantageously, the diffraction angle of the diffractive optical element or diffractive beam splitter optical unit 62 can furthermore be approximately 6° such that this results in a distance of 56 mm between the workpiece and diffractive beam splitter optical unit. Consequently, partial laser beams could be introduced into the workpiece 1 along a separation line 10 with a computed length of 11.76 mm.

In a manner analogous to FIG. 5A, the alternately polarized intensity profile can also be generated using a birefringent polarization element 4 according to FIG. 4B, in which the partial laser beams leave the birefringent polarization element 4 with a spatial offset. However, since an angular offset is required in the conjugate plane for the purpose of focusing the partial laser beams 26 onto the workpiece 1 in parallel with one another, at least one further lens arrangement is required in order to correct this beam angle of the partial laser beams 26 on the workpiece 1 (not shown).

Figure 5B:
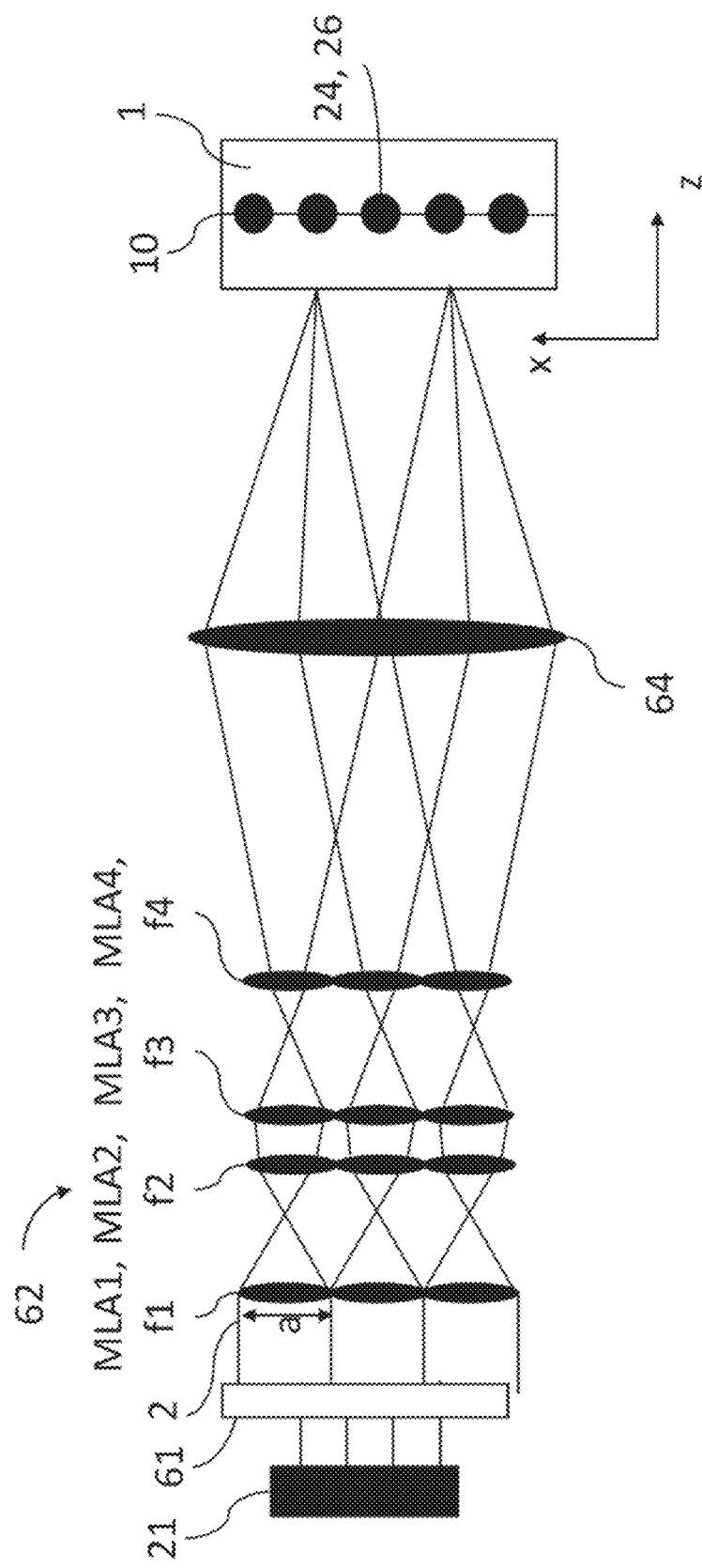

FIG. 5B schematically shows an alternative embodiment for generating partial laser beams 26.

FIG. 5B shows a microlens array optical unit, that is to say a beam splitter optical unit 62 as used for beam splitting. An incident laser beam 2 of a laser 21 is guided through an optional telescope optical unit 61 in order to adapt the diameter of the laser beam 2, and subsequently guided through the microlens array optical unit in order to generate a plurality of partial laser beams 26. In this case, the incident laser beam 2 is collimated at least in respect of the x-direction perpendicular to the beam propagation direction (z-direction).

The incident laser beam 2 passes through four microlens arrays MLA1-MLA4. Each microlens array MLA1-MLA4 comprises microlenses 622 with a sub-aperture a which are arrayed in the x-direction. The sub-aperture a measured along the x direction is the same for all microlenses arrays MLA1-MLA4. The microlenses arrays MLA1-MLA4 or the microlenses 622 thereof can all have different focal lengths f1-f4. The focal length f1-f4 of the microlenses 622 is uniform within a respective microlens array MLA1-MLA4.

All microlenses 622 are convex lenses in FIG. 5B. However, the microlenses 622 of MLA1 can also be concave lenses and the microlenses of MLA2-MLA4 can be convex lenses (not shown). This enables a laser beam 2 expansion, with the result that the peak intensity of the laser beam 2 between the microlens arrays 622 is attenuated. This can avoid a destruction of the subsequent optical elements. However, the number of convex microlens arrays is restricted to two in the case of a structure with four microlenses.

As a result of the microlens arrays MLA1-MLA4, each point of a respective microlens in the plane of the first microlens array MLA1 is imaged into an angle, that is to say an angular spectrum is generated. This angular spectrum is imaged into a focal plane, for example in or on a workpiece 1, using a focusing optical unit 6. In the process, the partial laser beams 26 arise as a result of interference and diffraction effects in the beam path.

Figure 5C:
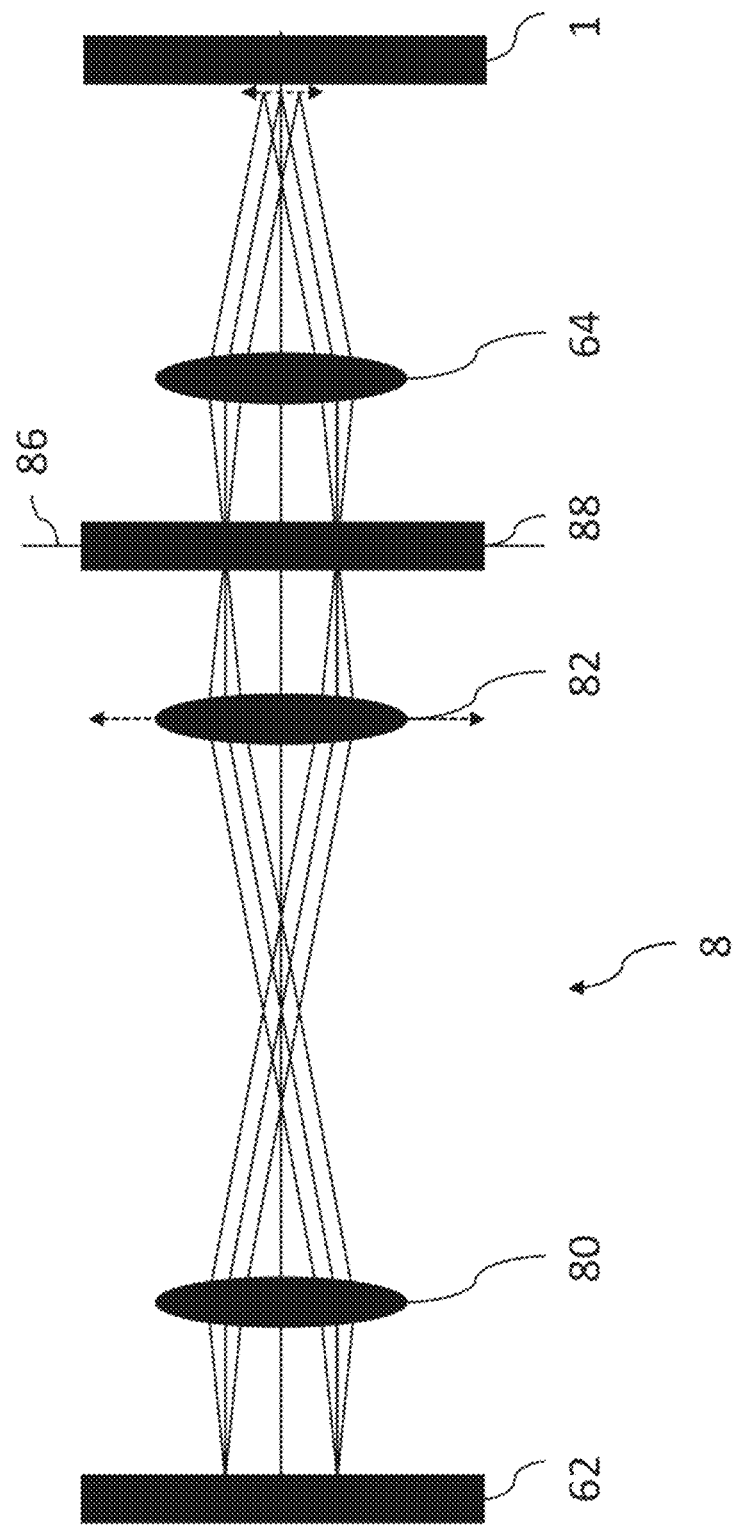

FIG. 5C shows a further embodiment for implementing the method. In this case, the beam splitter optical unit 62 generates various partial laser beams, which are guided to the focusing optical unit 64 by a lens optical unit 8 which consists of a first lens 80 and a second lens 82. In this case, the lens optical unit 8 is part of the processing optical unit 6. As a result of the lens optical unit 8, an optical plane 86 arises between the second lens 82 and the focusing optical unit 64, it being possible to introduce into the said optical plane a repositioning optical unit 88, by means of which the partial laser beams can be repeatedly moved away from their initial position along the separation line by a deflection value and subsequently can be moved back along the separation line. In particular, the partial laser beams can be moved in the plane perpendicular to the beam propagation direction in the process.

By way of example, the repositioning optical unit 88 can be a piezo mirror, a galvanometer scanner, an acousto-optic deflector, a polygonal wheel or two wedge plates that are continuously rotated with respect to one another, the rotational axis of which corresponds to the optical axis and the rotational frequency of which corresponds to the frequency of the repositioning. Alternatively, the second lens 82 may also be moved in transverse fashion in order to bring about a repositioning of the partial laser beams on or in the workpiece.

Alternatively, a diffractive optical element can also be written into the repositioning optical unit, the said diffractive optical element adopting the function of the beam splitter optical unit 62 such that the lens optical unit 8 can be dispensed with.

FIG. 6 schematically presents the method in which adjacent partial laser beams have different, more particularly orthogonal polarization directions. The laser beam 2 of the pulsed laser is split into a multiplicity of partial laser beams 26 with the aid of a processing optical unit 6, for example as shown in FIG. 5A or 5B, with the adjacent partial laser beams 26 having an orthogonal polarization with respect to one another and with the distance between the adjacent partial laser beams for example being able to be smaller than the diameter of the focal zones 24. This causes adjacent focal zones 24 for partial laser beams 26 with different polarizations to overlap. However, there are no bothersome interference effects on account of the different polarization. However, it may also be the case that the various partial laser beams 26 have a significantly larger spacing than the diameter of the focal zones 24. In principle, it is possible to set the distance L of the partial laser beams of different polarization by way of the polarizer element. By contrast, with the aid of the beam splitter optical unit 62 it is possible to adjust the number of partial laser beams 26 and the spacing of the partial laser beams 26 of the same polarization.

The use of the partial laser beams 26 with different polarization is advantageous inasmuch as the different polarization direction relative to the separation line 10 has an effect on the ablation depth per pulse and on the quality of the ablation edge. By way of example, a polarization perpendicular to the separation line 10 is suitable to increase the break resistance along the cut edge. By contrast, a polarization parallel to the separation line 10 may lead to particularly effective material ablation. By filling the positions between two partial laser beams of the same polarization with partial laser beams of another polarization, it is thus possible to exploit efficiency and quality increases of the different polarizations by way of different processing strategies.

Figure 7A:
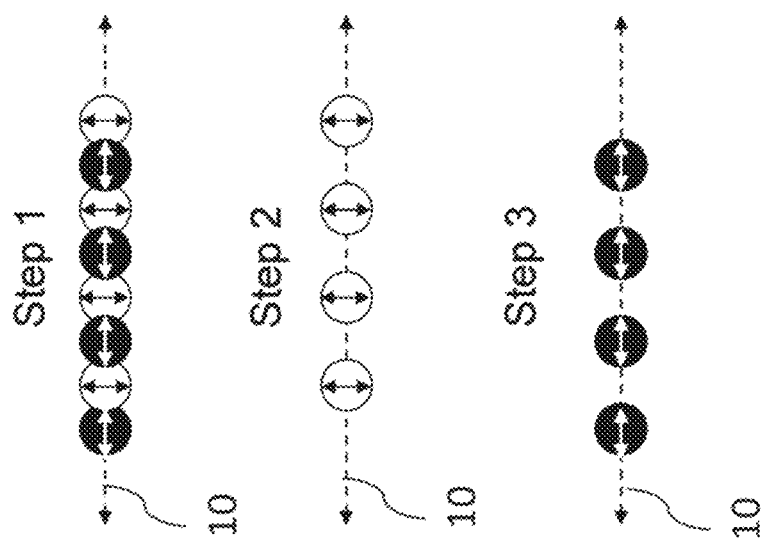
FIGS. 7A, 7B and 7C shows a further shows a further illustration of the method using partial laser beams with orthogonal polarization according to some embodiments.
Figure 7B:
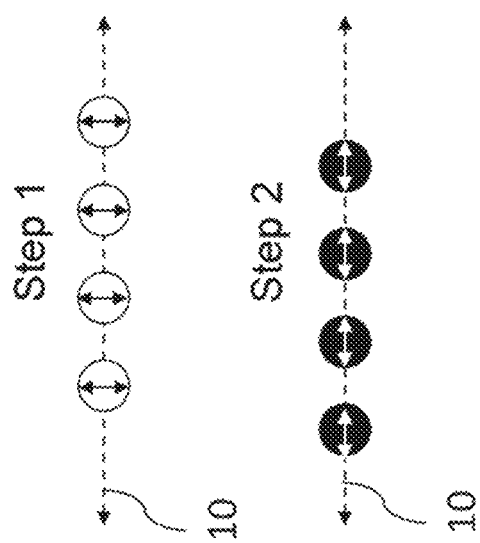
Figure 7C:
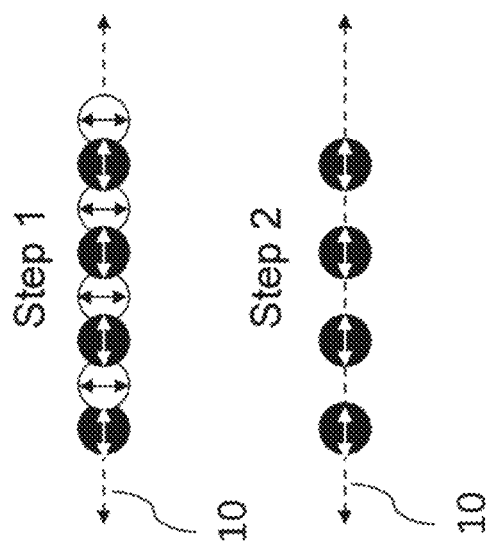

FIGS. 7A to 7C show various processing strategies with the method.

In FIG. 7A, a multiplicity of partial laser beams 26 are introduced into the workpiece 1 along the separation line 10 in a first step. The adjacent partial laser beams 26 have different polarizations. In particular, the adjacent partial laser beams are introduced into the workpiece 1 at a short distance from one another. The partial laser beams 26 are deflected or periodically deflected along the separation line 10 such that adjacent partial laser beams sweep over the same location on the separation line 10. However, the deflection may also be smaller than the distance between adjacent partial laser beams. Since the distance is for example so small, the intensity distribution of the partial laser beams is very homogeneous along the separation line 10, with the result that homogeneous material ablation along the separation line 10 is rendered possible.

In a second step, it is then possible for example to switch off the polarization components orthogonal to the separation line 10, for example by virtue of one of the optical elements in the processing optical unit 6 being varied, for example by way of a half-wave plate being rotated or a Pockels cell being switched, or the orthogonal polarization components being filtered, such that only partial laser beams 26 with a polarization parallel to the separation line 10 are introduced into the workpiece 1. By virtue of only partial laser beams with a polarization parallel to the separation line 10 being introduced into the workpiece 1 in the second step, it is thus possible to efficiently increase the ablation depth.

A substantial advantage of the two-step method in this case lies in the processing of the workpiece with overall twice the intensity with parallel polarization vis-à-vis orthogonal polarization. Since the ablation geometry arising from the first step is Gaussian, for example, and the intensity resulting on the surface decreases accordingly with increasing depth, the edge regions of the beam no longer exceed the material-specific ablation threshold and are therefore unable to efficiently contribute to ablation. Typically, the ratio of intensity on the surface to the material-specific ablation threshold is between 1 and 100, preferably between 5 and 10.

FIG. 7B shows a variation of the method in which, in a first step, use is only made of partial laser beams 26 with a polarization orthogonal to the alignment of the separation line. A high break resistance at the cut edge is generated in the first step as a result of the orthogonal alignment. In a second step, use is subsequently made only of partial laser beams with a polarization parallel to the separation line 10, with the result that the material can be separated with high efficiency.

FIG. 7C shows a further variation of the method, with partial laser beams being introduced into the workpiece 1 in a manner analogous to FIG. 7A in a first step, with adjacent partial laser beams being polarized orthogonally to one another. In a second step, it is then possible to generate a high break resistance of the separation edge by means of partial laser beams which are polarized parallel to the separation line 10, with exclusive use being made in a third step of partial laser beams which are polarized perpendicularly to the separation line 10 in order to quickly and efficiently increase the ablation depth. Overall, a high quality of the cut edge is ensured by the various methods of FIGS. 7A, B, C.

Insofar as applicable, all individual features presented in the exemplary embodiments can be combined with one another and/or interchanged, without departing from the scope of the invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Workpiece
10 Separation line
12 Surface
2 Laser beam
20 Laser pulse
21 Laser
22 Focal zone
24 Focal zone
26 Partial laser beam
260 First partial laser beam
262 Second partial laser beam
264 Third partial laser beam
280 First polarization
282 Second polarization
3 Displacement
30 Deflection
300 Deflection along the separation line
302 Deflection counter to the separation line
4 Birefringent polarizer element
40 Beam entrance surface
41 Beam exit surface
44 Optical axis
6 Processing optical unit
62 Beam splitter optical unit
622 Microlens
64 Focusing optical unit
8 Lens optical unit
80 First lens
82 Second lens
86 Optical plane
88 Repositioning optical unit
L Distance
MLA Microlens array

The invention claimed is:

1. A method for separating a workpiece along a separation line by using ultrashort laser pulses of a laser beam of an ultrashort pulse laser, the method comprising:
splitting the laser beam, using a beam splitter optical unit, into a plurality of partial laser beams, each of the partial laser beams being focused by a focusing optical unit onto a surface of the workpiece and/or into a volume of the workpiece so that the partial laser beams are arranged next to one another and spaced apart from one another along the separation line, and
implementing material ablation in the workpiece along the separation line by introducing the ultrashort laser pulses into the workpiece,
wherein
the partial laser beams are repeatedly moved away from an initial position along the separation line by a deflection value and are subsequently moved back along the separation line into the initial position, the deflection value being less than or equal to a distance between two adjacent partial laser beams.

2. The method as claimed in claim 1, wherein the movement of the partial laser beams away from the initial position by the deflection value and back to the initial position is carried out periodically.

3. The method as claimed in claim 1, wherein, following at least one movement of the partial laser beams away from the initial position by the deflection value and back into the initial position, the initial position is displaced along the separation line by a displacement value, and the movement of the partial laser beams is carried out anew.

4. The method as claimed in claim 1, wherein all of the partial laser beams implement the same movement simultaneously.

5. The method as claimed in claim 1, wherein the movement of the partial laser beams follows the separation line and, in a case of a straight separation line, the movement of the partial laser beams is a linear deflection following a straight shape of the separation line and, in a case of a curved separation line, the deflection of the partial laser beams is a deflection following a curved shape of the separation line.

6. The method as claimed in claim 1, wherein the movement of the partial laser beams is correlated with a repetition rate of the ultrashort pulse laser providing the laser beam in order to ensure uniform material ablation.

7. The method as claimed in claim 1, wherein the laser beam and/or the partial laser beams is and/or are decomposed into two mutually orthogonal polarization components by passing through a birefringent polarizer element.

8. The method as claimed in claim 7, wherein outgoing partial laser beams that have been decomposed according to polarization components by the birefringent polarizer element have an angular offset and/or spatial offset with respect to one another.

9. The method as claimed in claim 8, wherein the partial laser beams that are arranged next to one another and at a distance from one another have an alternating polarization along the separation line.

10. The method as claimed in claim 1, wherein the beam splitter optical unit comprises a diffractive beam splitter optical unit, and/or a diffractive optical element, and/or a system of microlens arrays.

11. The method as claimed in claim 1, wherein the movement of the partial laser beams is generated by a movement of the focusing optical unit and/or the beam splitter optical unit, and/or by a repositioning optical unit.

12. The method as claimed in claim 1, wherein all of the partial laser beams are focused into a same focal plane.

* * * * *